US008682922B2

(12) United States Patent
Boneti

(10) Patent No.: US 8,682,922 B2
(45) Date of Patent: Mar. 25, 2014

(54) METHOD AND SYSTEM FOR ACCESSING A VIRTUAL SEISMIC CUBE

(75) Inventor: Carlos Santieri de Figueiredo (S. F.) Boneti, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/425,207

(22) Filed: Mar. 20, 2012

(65) Prior Publication Data

US 2013/0254222 A1 Sep. 26, 2013

(51) Int. Cl.
*G06F 7/00* (2006.01)
*G06F 17/30* (2006.01)

(52) U.S. Cl.
CPC ....... *G06F 17/30592* (2013.01); *Y10S 707/958* (2013.01)
USPC .......................................... 707/769; 707/958

(58) Field of Classification Search
None
See application file for complete search history.

(56) References Cited

U.S. PATENT DOCUMENTS

| 6,161,105 | A | * | 12/2000 | Keighan et al. ................... 1/1 |
| 7,761,407 | B1 | * | 7/2010 | Stern .............................. 707/602 |
| 7,895,191 | B2 | * | 2/2011 | Colossi et al. ................... 707/717 |
| 2007/0022120 | A1 | * | 1/2007 | Huang et al. ..................... 707/10 |
| 2008/0208918 | A1 | * | 8/2008 | Yang et al. ....................... 707/200 |
| 2008/0243778 | A1 | * | 10/2008 | Behnen et al. ..................... 707/3 |
| 2009/0198663 | A1 | * | 8/2009 | Yang et al. ......................... 707/4 |
| 2010/0161361 | A1 | | 6/2010 | Spears et al. |

FOREIGN PATENT DOCUMENTS

KR 20090041700 A 4/2009

OTHER PUBLICATIONS

Great Britain Examination Report to Great Britain Application No. GB1304136.3 dated Aug. 30, 2013.

* cited by examiner

*Primary Examiner* — Jay Morrison
(74) *Attorney, Agent, or Firm* — Colin L. Wier; Rodney Warfford

(57) ABSTRACT

A method for processing requests includes receiving, from a requestor, a first read request to read a portion of a seismic cube. The first read request includes a virtual location of the portion. The method further includes querying a seismic cube index to obtain a mapping parameter and a storage location of a section including the portion of the seismic cube. The mapping parameter maps virtual locations in the seismic cube with data locations in the section. The section is identified using the virtual location of the portion. The method further includes calculating, on a computer processor and using the mapping parameter, a data location in the section corresponding to the virtual location of the portion, and transmitting a second read request to the storage location of the section. The second read request includes the data location. The requestor receives the portion from the storage location.

17 Claims, 9 Drawing Sheets

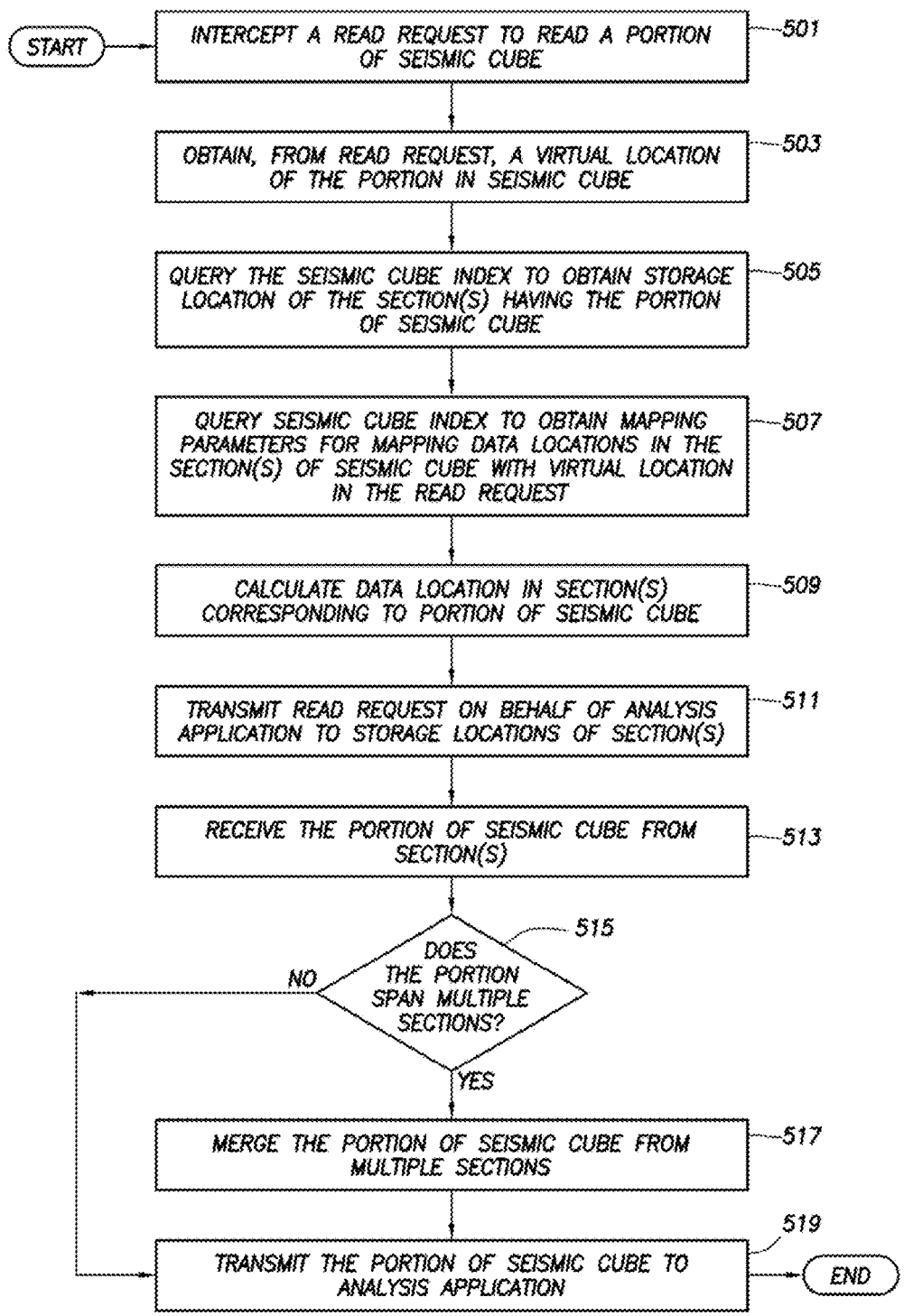

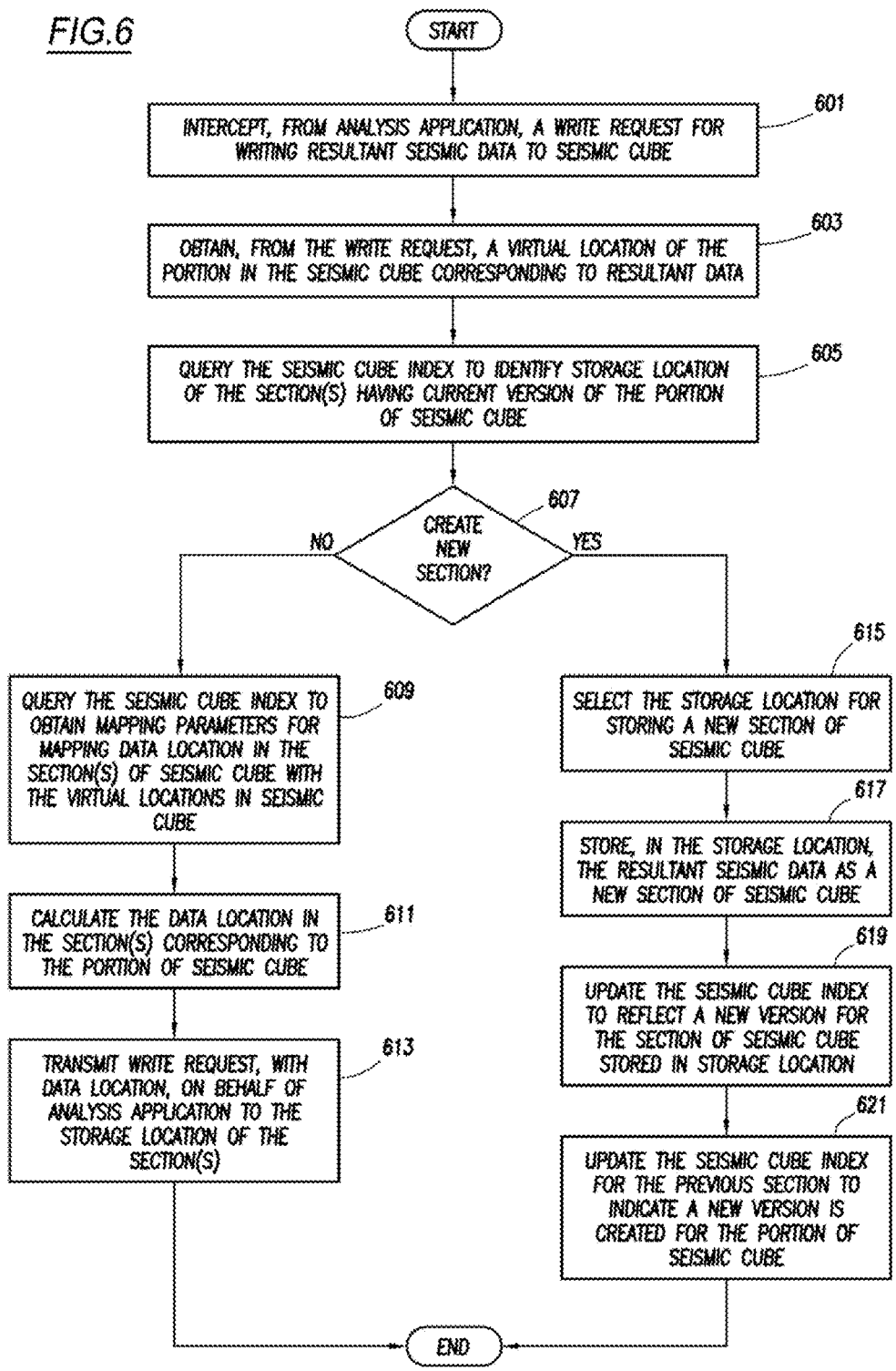

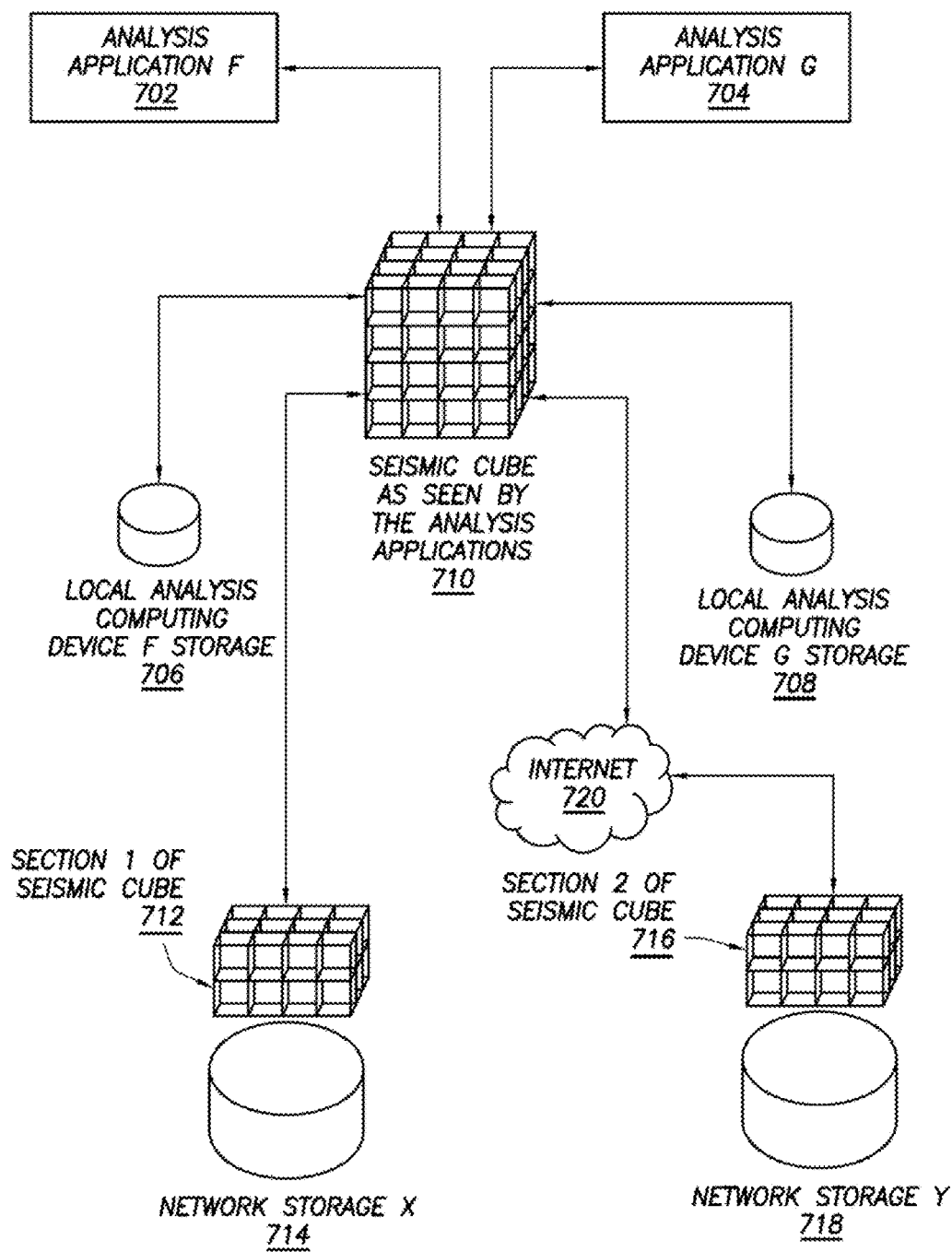
FIG.7.1

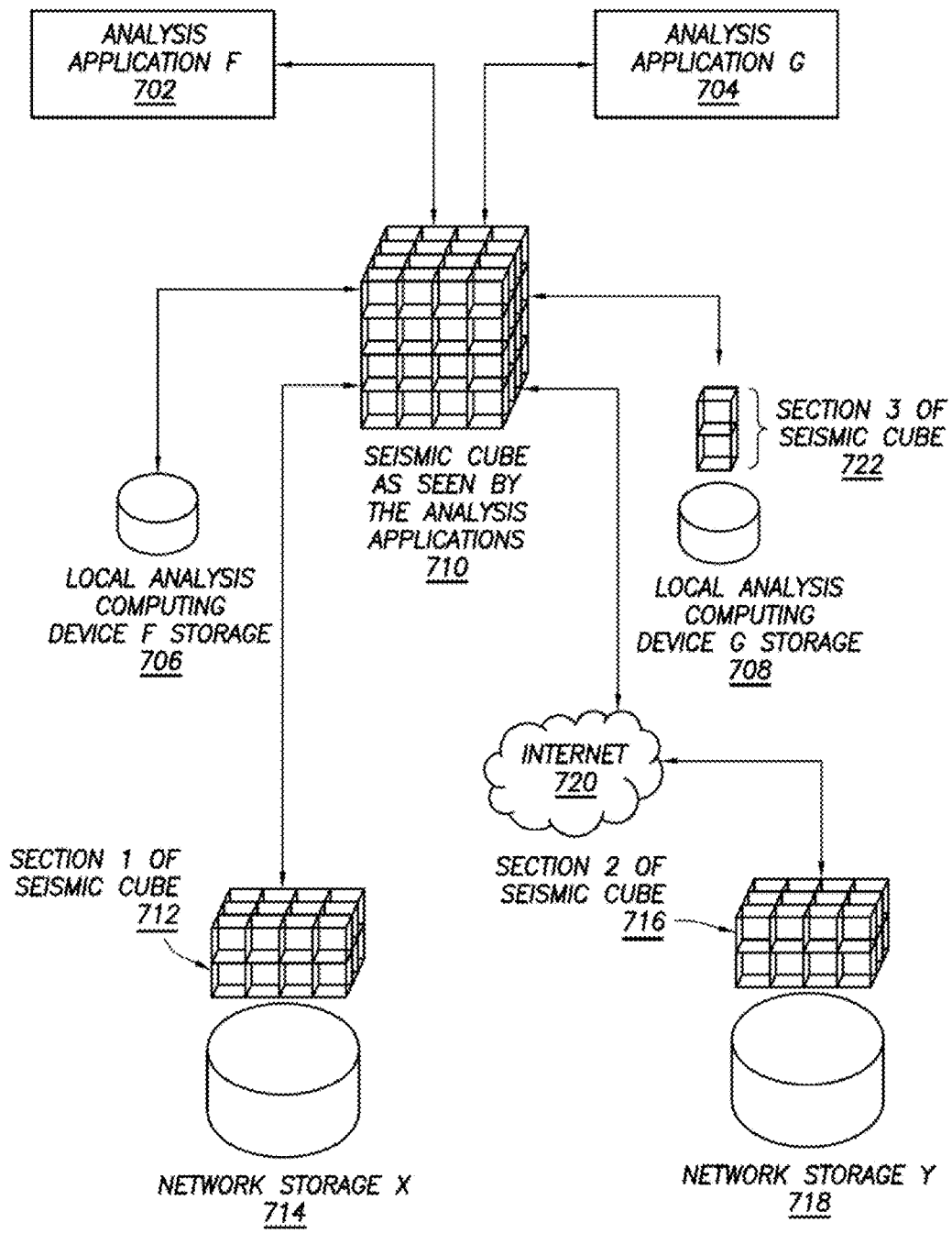
FIG.7.2

METHOD AND SYSTEM FOR ACCESSING A VIRTUAL SEISMIC CUBE

BACKGROUND

Seismic data is gathered and analyzed for many different purposes. For example, seismic data is used to identify fault zones for earthquake predictions, plan and mine for minerals, and extract fluids, such as hydrocarbons, and drilling other wells from the Earth's subsurface formations.

For example, with respect to extracting fluids, seismic data is used in a variety of stages of the process. Specifically, obtaining fluids generally require a planning stage, a drilling stage, and a production stage. Each stage may be performed one or more times. In the planning stage, surveys are often performed using acquisition methodologies, such as seismic mapping to generate acoustic images of underground formations. The seismic data is analyzed to determine the presence of subterranean assets, such as valuable fluids or minerals, or to determine whether the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required to extract them. The terms may also refer to sites where substances are deposited or stored by injecting substances into the surface using boreholes and the operations associated with this process.

During the drilling stage, a borehole is drilled into the earth at a position identified during the survey stage. Specifically, a drilling rig rotates a drill string that has a bit attached. Casing may be added to ensure the structural integrity of the borehole. During drilling, seismic data is used to direct the trajectory, or path in which the borehole is drilled.

During the completion stage, the drilling equipment is removed and the well is prepared for production. During the production stage, fluids are produced or removed from the subsurface formation. In other words, the fluids may be transferred from the subsurface formation to one or more production facilities (e.g. refineries). During the completion stage and production stage, seismic data may be used to analyze and monitor the processes of the respective stages.

SUMMARY

In general, in one aspect, embodiments relate to a method for processing requests for seismic data. The method includes receiving, from a requestor, a first read request to read a portion of a seismic cube. The first read request includes a virtual location of the portion. The method further includes querying a seismic cube index to obtain a mapping parameter and a storage location of a section including the portion of the seismic cube. The mapping parameter maps virtual locations in the seismic cube with data locations in the section. The section is identified using the virtual location of the portion. The method further includes calculating, on a computer processor and using the mapping parameter, a data location in the section corresponding to the virtual location of the portion, and transmitting a second read request to the storage location of the section. The second read request includes the data location. The requestor receives the portion from the storage location.

In general, in one aspect, embodiments relate to a system that includes a memory device, a seismic cube index stored in the memory device and including index entries. An index entry includes a virtual location of a section, a storage location of the section, and a mapping parameter for mapping virtual locations in a seismic cube to data locations in the section. The system further includes a computer processor and a seismic cube index application, executing on the computer processor. The seismic cube index application is configured to receive a first read request to read a first portion of the seismic cube. The first read request includes a virtual location of the first portion. Using the virtual location of the portion, the seismic cube index is queried to obtain the mapping parameter and the storage location of the section having the portion. The section is identified using the virtual location of the section and the virtual location of the portion. Using the mapping parameter, a first data location in the first section corresponding to the virtual location of the first portion is calculated. Further, the seismic cube index application is configured to transmit a second read request to the storage location of the section. The second read request includes the first data location.

In general, in one aspect, embodiments relate to a distributed computer system that include multiple computing devices. The computing devices include an index computing device operatively connected to at least one storage device and at least one analysis computing device. The analysis computing device includes at least one analysis application. The index computing device is configured to store a seismic cube index in a memory device, receive a first write request for writing resultant seismic data to seismic cube. The first write request including a virtual location of a portion of the seismic cube. The index computing device is further configured to query, using the virtual location of the portion, the seismic cube index to identify a section having a portion corresponding to the virtual location, detect that the first section is being accessed by multiple analysis applications, select a storage device for storing a new section of seismic cube, send, to the storage device, a storage request to store the resultant seismic data as the new section, update the seismic cube index to reflect that the portion is stored in a storage location on the storage device, and update the seismic cube index to indicate, for the section, that a new version is created for the portion.

Other aspects will be apparent from the following description and the appended claims.

BRIEF DESCRIPTION OF DRAWINGS

FIGS. 4-6 show examples of flowcharts in one or more embodiments.

FIGS. 7.1, 7.2, and 8 shows examples in one or more embodiments.

DETAILED DESCRIPTION

Figure 1:
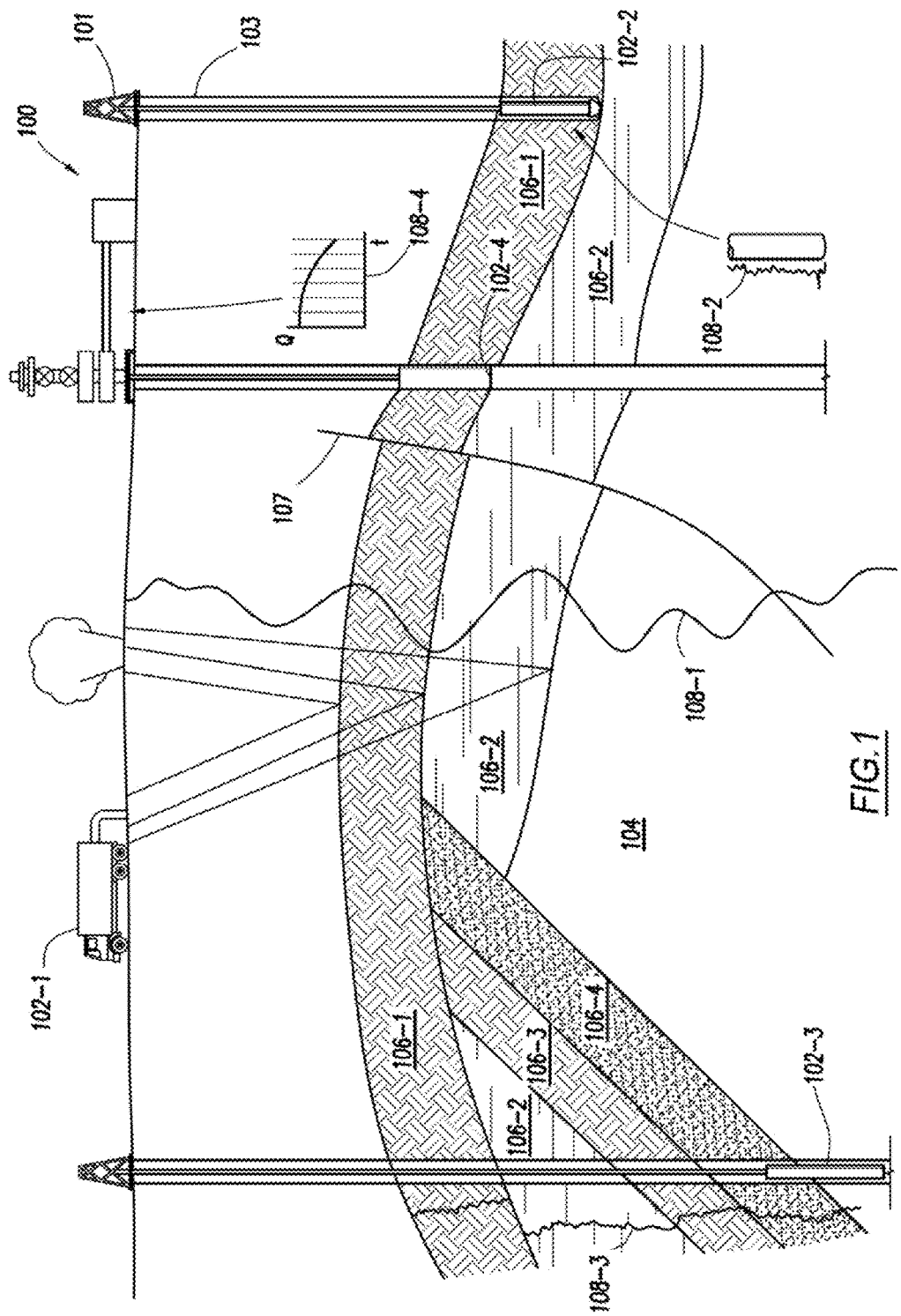
FIG. 1 shows an example of a schematic diagram of a data collection system in one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for processing requests for seismic data. Specifically, embodiments group the seismic data into a seismic cube. A seismic cube is a set of seismic data elements specified for each portion of a geographic region that specifies a position of each data element in the geographic region. The seismic cube is capable of being represented as a cube of imaging data. Sections of the seismic cube are distributed, such that the seismic cube may be stored on multiple storage devices. A seismic cube index stores associations between sections of the seismic cube and which storage device has the section. The seismic cube index further maintains a mapping parameter that defines how locations in a section map to locations in the seismic cube.

FIG. 1 shows an example of a schematic diagram of a data collection system in one or more embodiments. Specifically, FIG. 1 depicts a schematic view, partially in cross section of a field (100) having data acquisition tools (102-1), (102-2), (102-3), and (102-4) positioned at various locations in the field for gathering data of a subterranean formation (104). As shown, the data collected from the tools (102-1 through 102-4) can be used to generate data plots (108-1 through 108-4), respectively.

As shown in FIG. 1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

As shown in FIG. 1, a drilling operation is depicted as being performed by drilling tools (102-2) suspended by a rig (101) and advanced into the subterranean formations (104) to form a wellbore (103). The drilling tools (102-2) may be adapted for measuring downhole properties using logging-while-drilling ("LWD") tools.

A surface unit (now shown) is used to communicate with the drilling tools (102-2) and/or offsite operations. The surface unit is capable of communicating with the drilling tools (102-2) to send commands to the drilling tools (102-2), and to receive data therefrom. The surface unit is preferably provided with computer facilities for receiving, storing, processing, and/or analyzing data from the oilfield. The surface unit collects data generated during the drilling operation and produces data output which may be stored or transmitted. Computer facilities, such as those of the surface unit, may be positioned at various locations about the oilfield and/or at remote locations.

Sensors, such as gauges, may be positioned about the oilfield to collect data relating to various oilfield operations as described previously. For example, the sensor may be positioned in one or more locations in the drilling tools (102-2) and/or at the rig (101) to measure drilling parameters, such as weight on bit, torque on bit, pressures, temperatures, flow rates, compositions, rotary speed and/or other parameters of the oilfield operation. The sensors may also have features or capabilities, of monitors, such as cameras (not shown), to provide pictures of the operation. Surface sensors or gauges may be deployed about the surface systems to provide information about the surface unit, such as standpipe pressure, hook load, depth, surface torque, and rotary rpm, among others. Downhole sensors or gauges (i.e., sensors located within the borehole) are disposed about the drilling string and/or wellbore to provide information about downhole conditions, such as wellbore pressure, weight on bit, torque on bit, direction, inclination, collar rpm, tool temperature, annular temperature and tool face, and other such data. In one or more embodiments, additional or alternative sensors may measure properties of the formation, such as gamma rays sensors, formation resistivity sensors, formation pressure sensors, fluid sampling sensors, hole-calipers, and distance stand-off measurement sensors, and other such sensors. The sensors may continually gather data and directly or indirectly update the seismic cube as discussed below. In one or more embodiments, with each update to the seismic cube, the seismic cube index is updated to reflect the additional sensor data.

Figure 2:
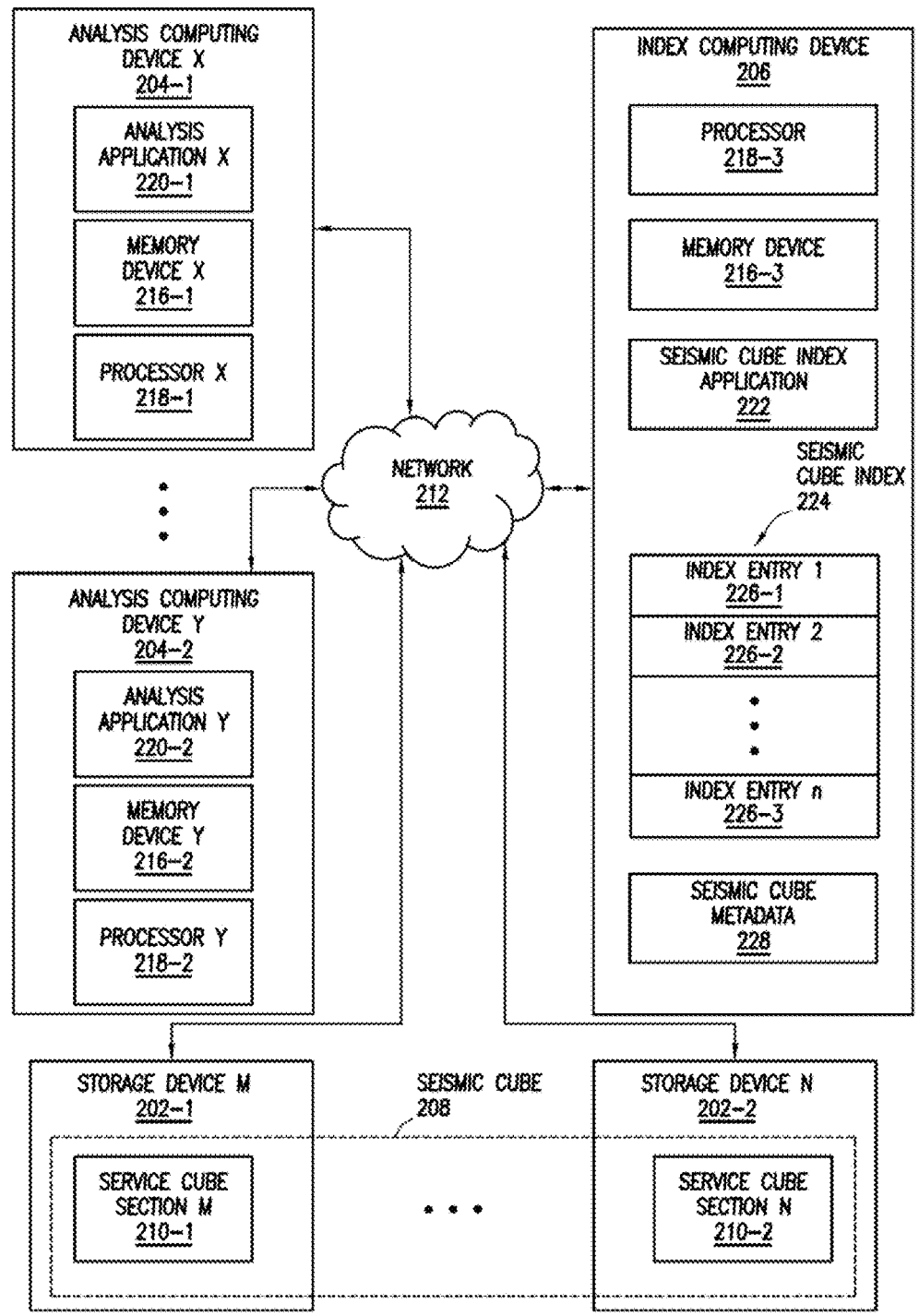
FIG. 2 shows an example schematic diagram of a distributed computer system in one or more embodiments.

The data gathered by the sensors may be collected by one or more components of the system shown in FIG. 2. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be historical data, real time data or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/or reservoir engineering. In this example, the reservoir, wellbore, surface and/or process data may be used to perform reservoir, wellbore, geological, geophysical or other simulations. The data outputs from the oilfield operation may be generated directly from the sensors, or after some preprocessing or modeling. These data outputs may act as inputs for further analysis.

As shown in FIG. 1, data plots (108-1 through 108-4) are examples of plots of static properties that may be generated by the data acquisition tools (102-1 through 102-4), respectively. For example, data plot (108-1) is a seismic two-way response time. In another example, data plot (108-2) is core sample data measured from a core sample of the formation (104). In another example, data plot (108-3) is a logging trace. In another example, data plot (108-4) is a plot of a dynamic property, the fluid flow rate over time. In addition to the aforementioned data plots, a seismic cube may be constructed from the different types of data. Other data may also be collected, such as, but not limited to, historical data, user inputs, economic information, other measurement data, and other parameters of interest.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this documents based on the context.

FIG. 2 shows an example schematic diagram of a distributed computer system in one or more embodiments. As shown in FIG. 2, the distributed computer system includes storage devices (e.g., storage device M (202-1), storage device N (202-2)), analysis computing device (e.g., analysis computing device X (204-1), analysis computing device Y (204-2)), index computing device (206), and a network (212) in one or more embodiments. Each of these components is described below.

A storage device (e.g., storage device M (202-1), storage device N (202-2)) is a device for storing data. For example, a storage device may be a storage server, a hard disk, an optical drive such as a compact disk drive or digital video disk (DVD) drive, a flash memory stick, or another type of device. The storage devices are geographically distributed in one or more embodiments. For example, storage device M (202-1) may be located in Venezuela while storage device N (202-2) may be located in Europe. The storage devices (e.g., storage device M (202-1), storage device N (202-2)) include functionality to store the seismic cube (208) in one or more embodiments. Specifically, each storage device includes functionality to store at least a section (e.g., seismic cube section M (210-1), seismic cube section N (210-2)) of the seismic cube (208). A section of the seismic cube is a contiguous region of seismic data. More specifically, a section of seismic cube may be defined by geographic coordinates specifying a boundary of the section.

In one or more embodiments, the sections of the seismic cube stored by different storage devices may or may not be overlapping. For example, a main server may store the entire seismic cube while other servers store sections of the seismic cube. Additionally, although not shown in FIG. 2, the analysis computing device may also store a portion of the seismic cube, such as a portion that the analysis application is using or has recently used.

In one or more embodiments, each computing device (e.g., analysis computing device X (204-1), analysis computing device Y (204-2), index computing device (206)) includes one or more processor(s) (e.g., processor X (218-1), processor Y (218-2), index processor (218-3)) and associated memory (e.g., memory device X (216-1), memory device Y (214-2), index memory device (216-3)) (e.g., random access memory (RAM), cache memory, flash memory, etc.). The processor (e.g., processor X (218-1), processor Y (218-2), index processor (218-3)) includes functionality to execute the corresponding application (e.g., analysis application X (220-1), analysis application Y (220-2), seismic cube index application (222)). In other words, the corresponding application executes on the processor (e.g., processor X (218-1), processor Y (218-2), index processor (218-3)). The memory (e.g., memory device X (216-1), memory device Y (216-2), index memory device (216-3)) includes functionality to store data and instructions for use by the processor (e.g., processor X (218-1), processor Y (218-2), index processor (218-3)) while executing the corresponding application. Additionally, one or more of the computing devices may include its own storage device (not shown) (e.g., a hard disk, an optical drive such as a compact disk drive or digital video disk (DVD) drive, a flash memory stick, etc.), and numerous other elements and functionalities typical of today's computers (not shown).

One or more of the computing devices may further include input means, such as a keyboard, a mouse, or a microphone, and output means, such as a monitor (e.g., a liquid crystal display (LCD), a plasma display, or cathode ray tube (CRT) monitor). Many different types of computing devices exist, and the aforementioned input and output means may take other forms. Generally speaking, the computing device (e.g., analysis computing device X (204-1), analysis computing device Y (204-2), index computing device (206)) includes at least the minimal processing, input, and/or output means necessary to practice embodiments of the invention. For example, one or more of the computing devices may be a desktop computer, a laptop computer, one or more servers, a mobile computing device, such as a tablet computer or a mobile phone, or any other type of computing device.

Further, although not shown in FIG. 2, one or more of the computing devices may, itself, be a distributed computer. For example, portions the computing device may be located at a remote location and connected to the other portions over a network, such as network (212) or another network. For example, the computing device may have multiple nodes, where each portion may be located on a different node. In one or more embodiments, the node corresponds to a computer system. Alternatively, the node may correspond to a processor with associated physical memory. The node may alternatively correspond to a processor or micro-core of a processor with shared memory and/or resources. Further, software instructions to perform embodiments may be stored, temporarily or permanently, in whole or in part, on a non-transitory computer readable medium such as a compact disc (CD), a local or remote storage device, local or remote memory, a diskette, or any other computer readable storage device.

The computing devices (e.g., analysis computing device X (204-1), analysis computing device Y (204-2)), index computing device (206)) are connected via a network (212). The network (212) may be a local area network (LAN), a wide area network (WAN) such as the Internet, any other type of network, or a combination of one or more types of networks.

Continuing with FIG. 2, an analysis computing device (e.g., analysis computing device X (204-1), analysis computing device Y (204-2)) includes an analysis application (e.g., analysis application X (220-1), analysis application Y (220-2)) in one or more embodiments. In one or more embodiments, the analysis application (e.g., analysis application X (220-1), analysis application Y (220-2)) includes functionality to analyze seismic data. For example, the analysis application (e.g., analysis application X (220-1), analysis application Y (220-2)) may include functionality to receive seismic data, directly or indirectly, from one or more sensors dispersed throughout the oilfield and analyze the seismic data. The analysis application (e.g., analysis application X (220-1), analysis application Y (220-2)) may further include functionality to create a seismic cube (208) (discussed below) or a portion of the seismic cube (208). Further, in one or more embodiments, the analysis application (e.g., analysis application X (220-1), analysis application Y (220-2)) includes functionality to request a portion of the seismic cube and store resultant seismic data in the seismic cube.

By way of an example of the analysis application, the analysis application may be an oilfield application that includes functionality to plan an oilfield (e.g., identify a subsurface reservoir having hydrocarbons, generate a desired trajectory to drill a borehole to the hydrocarbons, etc.), assist in drilling operations (e.g., monitor drilling equipment while the drilling equipment is drilling the borehole, receive sensor data from the drilling equipment, analyze the sensor data with the seismic data from the seismic cube, generate an alternative trajectory or update the drilling equipment based on the analysis, and transmit commands to the drilling equipment to adjust the drilling of the oilfield), and/or assist in production operations (e.g., monitor the production from a particular oil well, monitor a network of wells, analyze the production with respect to the seismic data in the seismic cube, and transmit a command to one or more wells to adjust the flow of hydrocarbons from the one or more wells). The above are merely examples of the analysis application (e.g., analysis application X (220-1), analysis application Y (220-2)). The analysis application may perform other functions without departing from the scope of the claims.

The portion of seismic cube requested and/or stored by the analysis application may or may not correspond to a section of the seismic cube stored by a storage device. Specifically, a portion may be a subsection of a section of the seismic cube stored by a storage device, an entire section of the seismic cube stored by a storage device, or span all or part of multiple sections of the seismic cube stored by multiple storage devices. In one or more embodiments, the partitioning of the seismic cube into sections is hidden from the analysis application (e.g., analysis application X (220-1), analysis application Y (220-2)). In other words, the analysis application (e.g., analysis application X (220-1), analysis application Y (220-2)) is unaware that there are multiple sections of the seismic cube (208) or that the multiple sections are stored on different storage devices (e.g., storage device M (202-1), storage device N (202-2)). Thus, as shown by the dashed lines in FIG. 2, to each analysis application (e.g., analysis application X (220-1), analysis application Y (220-2)), the seismic cube is a complete unified collection of seismic data for a particular geographic region.

Continuing with FIG. 2, the index computing device (206) is a computing device for managing access to the seismic cube. Specifically, the index computing device (206) is configured to intercept requests for portions of the seismic cube (208) and transmit requests for the portions of the seismic cube to the corresponding or particular storage device(s) (e.g., storage device M (202-1), storage device N (202-2)) storing the portion. The index computing device includes a seismic cube index application (222), seismic cube metadata (228), and a seismic cube index (224) in one or more embodiments.

The seismic cube index application (222) includes functionality to receive an intercepted request from an analysis application (e.g., analysis application X (220-1), analysis application Y (220-2)) for a portion of the seismic cube. The intercepted request may be a read request to read the portion of the seismic cube or a write request to write resultant seismic data to the portion of seismic cube. For a read request or write request, the seismic cube index application (222) is configured to identify the section(s) of seismic cube having the portion of the seismic cube, identify one or more storage devices that have the section(s), and transmit the read request or write request to the one or more storage devices. The seismic cube index application (222) may further be configured to merge sub-portions of the seismic cube from different sections into a complete portion of the seismic cube and transmit the complete portion to the analysis application. Processing a read request, such as by the seismic cube index application (222), is discussed below and in FIG. 5. Processing a write request, such as by the seismic cube index application (222), is discussed below and in FIG. 6.

In one or more embodiments, seismic cube metadata (228) provides information about the seismic cube (208). For example, seismic cube metadata may include a geometry of the seismic cube (e.g., depth, size, number of in-lines, number of cross-lines, sample rate, samples per trace, reference point on seismic cube), statistics about the seismic cube (e.g., average values, minimum values, maximum values of the seismic cube), and other information about the seismic cube (208).

The seismic cube index application (222) is operatively connected to the seismic cube index (224). In one or more embodiments, the seismic cube index (224) is stored in a data repository (not shown). In one or more embodiments, the data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. For example, a portion of the data repository may be on one server while another portion is distributed across the Internet and on another server.

The seismic cube index (224) stores information about where portions of the seismic cube are stored. In one or more embodiments, the seismic cube index (224) includes index entries (e.g., index entry 1 (226-1), index entry 2 (226-2), index entry n (226-3)). An index entry (e.g., index entry 1 (226-1), index entry 2 (226-2), index entry n (226-3)) identifies where a section of the seismic cube is located with respect to the larger seismic cube and which storage device stores the section. For example, the index entry may identify seismic cube section M (210-1) as corresponding to the top right quadrant of the seismic cube (208) and section N (210-2) as corresponding to the bottom middle region of the seismic cube (208).

Figure 3:
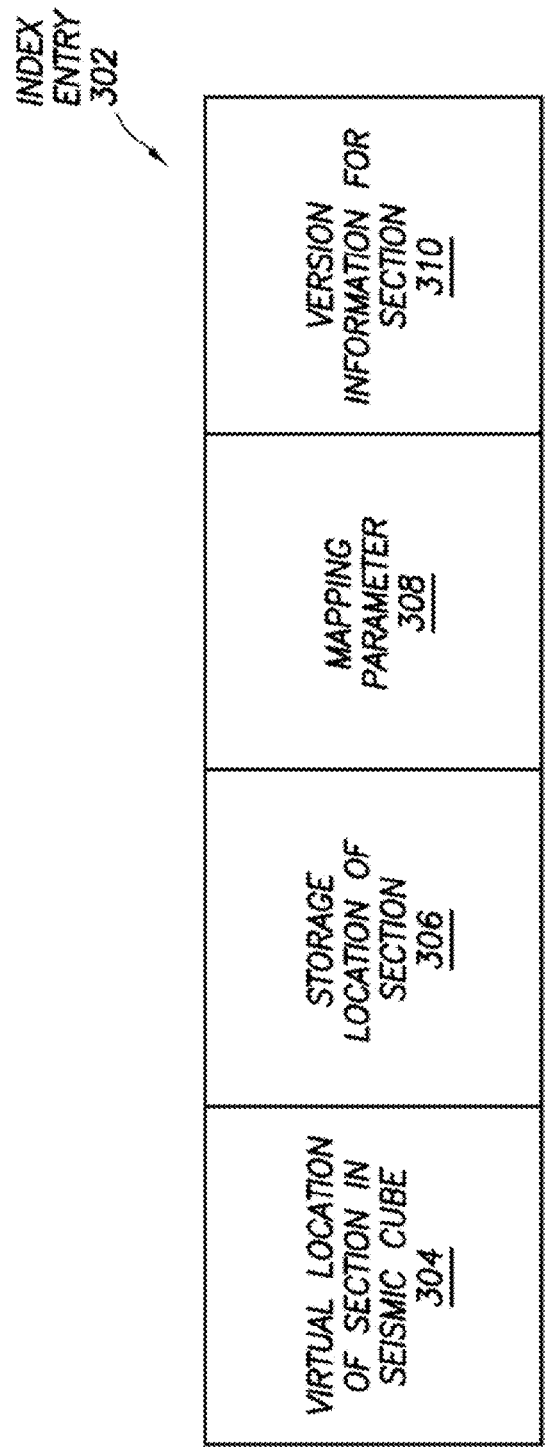
FIG. 3 shows an example of a schematic diagram of an index entry in one or more embodiments.

FIG. 3 shows an example of a schematic diagram of an index entry (302) in one or more embodiments. As shown in FIG. 3, an index entry (302) includes a virtual location of the section in the seismic cube (304) (hereinafter "section virtual location"), a storage location of the section (306) (hereinafter "section storage location"), a mapping parameter (308), a version information for the section (310) (hereinafter "section version information"). Each of these components is described below.

In one or more embodiments, a section virtual location (304) is an identifier of the position of the section in relation to the entire seismic cube. In other words, the section virtual location (304) identifies where the section is located within the context of the entire seismic cube. Different identification techniques may be used as the section virtual location (304).

By way of an example, consider the scenario in which the entire seismic cube is defined by a set of geographic coordinates specifying the boundaries of the geographic region represented by the seismic cube. The section virtual location may be specified using one or more offsets and lengths (e.g., one offset and length for each dimension of the three dimensional section) from a particular geographic coordinate in the set of geographic coordinates defining the seismic cube.

By way of another example, the section virtual location may be specified using geographic coordinates specifying the boundaries of the geographic region represented by the particular section. In other words, the section virtual location may use the same identification mechanism as in the example discussed above for the entire seismic cube.

As another example, the section virtual location may be specified by defining the actual boundaries of the section or the boundaries of the section in relation to the entire seismic cube. For example, the section virtual location may be specified using a metes and bounds description. As another example, the section virtual location may be specified using a starting point and ending point for each dimension of the three dimensional section.

The above are merely a few examples of identification mechanisms that may be used as the section virtual location (304). Other identification mechanisms may be used without departing from the scope of the claims.

Continuing with FIG. 3, the section storage location (306) specifies the particular storage device having the section and/or the location of the section on the storage device. For example, the section storage location may include a name of the storage device having the section, an internet protocol address for the storage device, or another identification mechanism. The location of the section on the storage device may be, for example, a file name or other identifier of the section on the storage device. Other identification mechanisms may be used for the section storage location (306) without departing from the scope of the claims.

In one or more embodiments, the mapping parameter (308) defines how locations in the seismic cube map to locations in the section. Specifically, the mapping parameter (308) defines how a requested portion of the seismic cube maps to the section. For example, the mapping parameter may identify that inline X, crossline Y of section A maps to inline Z, crossline W of seismic cube B. As another example, the mapping parameters may specify a set of equations for identifying a requested portion within the section. For example, the mapping parameter may indicate, for each dimension, a particular value to subtract from the virtual location of the requested portion. Thus, an analysis application may use a virtual location of the requested portion without regard to how the requested portion fits within the entire section.

The section version information (310) provides information about the version of the section. For example, the section version information may identify the version number of the section that the storage device is storing. The version number may be a natural number (e.g., version "1", version "2", etc.), a timestamp of the version, a hash value, or other identifier. For example, each time the section is modified, the section version information for the section may be updated. Additionally or alternatively, the version information of the section may include additional data, such as a username of a user that last updated the section of the seismic cube, comments from the user that updated the seismic cube, and other information. For example, the comments from the user may identify how the section of the seismic cube is updated for the new version. Alternatively or additionally, in one or more embodiments, the index entry may correspond to a reference to a versioning table. The versioning table may include a username, comments of the user, data, program associated to the software version, and other information.

In one or more embodiments, the section version information (310) may include separate version information for individual portions of the section. For example, consider the scenario in which an analysis application updates a first portion of the section. In the example, the section version information may include an identifier of the first portion of the section to uniquely identify the first portion and a timestamp specifying when the first portion of the section was last updated.

Although the above and FIGS. 2 and 3 discuss and show a seismic cube index application as located on a separate device than the analysis application, the analysis application and the seismic cube index application, with or without the seismic cube index, may be on the same computing device in one or more embodiments. Specifically, the seismic cube index application may be a local application on the analysis computing device. Further, rather than being a stand-alone application in one or more embodiments, the seismic cube index application may be a plug-in for the analysis application. For example, native code of the analysis application may include native functionality to interact with a single file having an entire seismic cube. With the distributed seismic cube, the native code may be redirected to a seismic cube index application plug-in that operates to identify the storage location of the portion of the seismic cube using the seismic cube index. In other words, the seismic cube index application as a plug-in may hide the existence of the distributed seismic cube from the native code. By way of another example, in one or more embodiments, the seismic cube index application may be an architectural part of the analysis application that hides the complexity of the seismic cube. For example, the architectural part may be a separate class, routine, or other component of the analysis application.

Although not shown in FIGS. 2 and 3, the analysis application, user using the analysis application, oilfield company, or other entity may be associated with one or more policies. Specifically, the policies may include, for example, a write policy and a read access policy. For example, the write policy may define whether to ask the user for the storage location, ask the user whether to write a new version, specify when to write a new version, specify the storage location for a new version, specify how to write a new version (e.g., whether to write on local memory and then commit the write to another storage location). A read access policy may specify which version to use when multiple versions are available (e.g., whether to ask a user, use the most recent version, use a version that satisfies certain parameters, etc.), where to obtain a version when multiple duplicates are available. One or more of policies may be specified as a predefined ordered list of storage locations. Alternative or additionally, one or more of the policies may be specified in terms of a function of properties of the desired storage location, such as data access speed, accessibility, data integrity, security, amount of storage space available, and other information. The one or more policies may be enforced by the seismic cube index application, the analysis application, another application, or a combination thereof.

Figure 4:
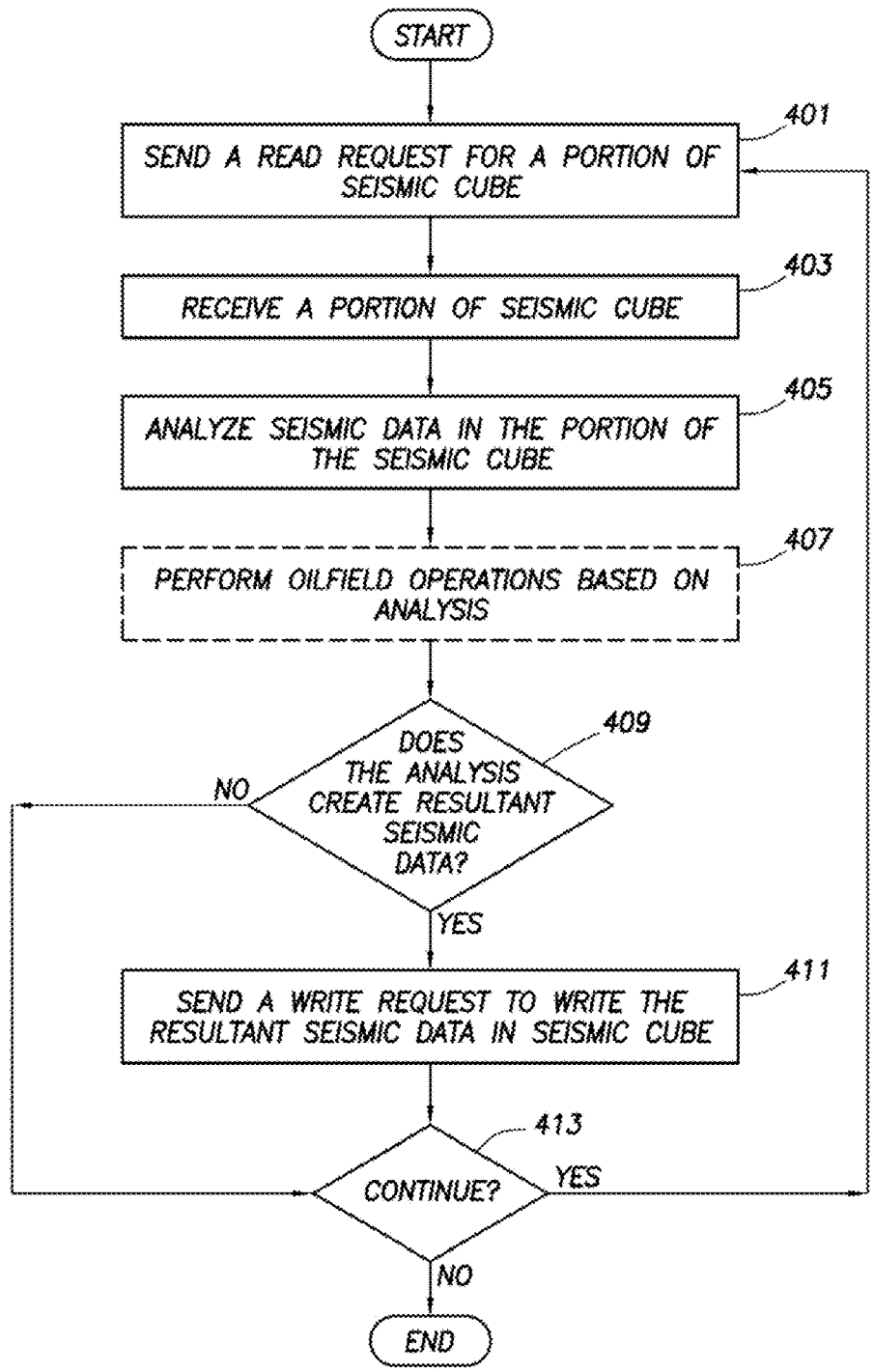

FIGS. 4-6 show examples of flowcharts in one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 4 shows an example of a flowchart for accessing the seismic cube. For example, the steps of FIG. 4 may be performed by the analysis application executing on the analysis computing device in one or more embodiments. In 401, a read request for a portion of the seismic cube is sent. In one or more embodiments, the read request references the portion of the seismic cube by using the location of the portion relative to the entire seismic cube. In other words, the read request may include merely the portion virtual address as the reference to the particular portion of the seismic cube that is requested. By allowing the read request to include the portion virtual address rather than the actual address, embodiments provide a mechanism for the analysis application to be unaware that the seismic cube is distributed or how to access the particular portion of the seismic cube. The portion virtual location in the read request may be specified similar to the section virtual location discussed above and in FIG. 3. Specifically, the identification techniques discussed above with respect to identifying the location of a section in the seismic cube may be used to identify the location of the portion in the seismic cube.

Continuing with the discussion, the analysis application may or may not be aware that the seismic cube is remotely stored. For example, in one or more embodiments, from the analysis application perspective, sending the read request may be performed by performing a general read system call to the operating system of the analysis computing device. The operating system may include instructions for transmitting the read request to a remote address corresponding to the seismic cube. As another example, the analysis application may use a remote address, such as a domain address, an internet protocol address, or another address, defined for the seismic cube while being simultaneously unaware of how the seismic cube is stored. For example, if the analysis application or the operating system uses a domain address or other address, the read request may be transmitted to an internet protocol address of the index computing device. Thus, the analysis computing device can remain unaware of the index computing device.

In 403, a portion of the seismic cube is received in one or more embodiments. The portion of the seismic cube may be received from the storage device storing the portion or the portion may be received from the index computing device in one or more embodiments.

In 405, the seismic data in the portion of the seismic cube is analyzed. For example, consider the scenario in which the seismic data in the seismic cube is used for oilfield operations. In such a scenario, analyzing the seismic data may be performed to identify rock properties, identify a location of a reservoir, plan a borehole trajectory to the reservoir, analyze the drilling operations of the oilfield, or perform other such steps.

In 407, oilfield operations may be performed based on the analysis in one or more embodiments. For example, the oilfield operations may be performed by the analysis computing device sending a command to drilling or production equipment. For drilling, by way of examples, the command may be to modify the trajectory in which the borehole is drilled, adjust a component of the equipment (e.g., adjust the bit or a position of a stabilizer), or perform another operation. For production operations, by way of an example, the command may be to adjust a choke position of one or more wells to change the flow of hydrocarbons to the wells. With respect to planning oilfield operations, the analysis application may generate a well plan identifying whether, where, and how to drill at the oilfield. Similar to other steps of FIG. 4, although FIG. 4 shows the performance of oilfield operations as being after analyzing seismic data, the oilfield operations may be performed any time, if at all, during the process of FIG. 4.

In 409, a determination is made whether the analysis in 405 creates resultant seismic data for storage in the seismic cube. In 411, if the analysis in 405 creates resultant seismic data, then a write request is sent to write the resultant seismic data to the seismic cube. A write request may be sent in a manner similar to sending the read request. Specifically, the write request may reference the portion of the seismic cube by using the location of the portion relative to the entire seismic cube in one or more embodiments.

Continuing with the discussion, the analysis application may or may not be aware that the seismic cube is remotely stored. For example, in one or more embodiments, from the analysis application perspective, sending the write request may be performed by performing a general write system call to the operating system of the analysis computing device. The operating system may include instructions for transmitting the write request to the remote address corresponding to the seismic cube. As another example, the analysis application may use the remote address defined for the seismic cube while being simultaneously unaware of how the seismic cube is stored.

In 413, a determination is made whether to continue. For example, the analysis application may continue to request seismic data from the seismic cube and write resultant seismic data to the seismic cube. In one or more embodiments, the processing by the analysis application may be performed continually while oilfield operations are performed. For example, as the seismic cube is updated with new sensor data from the oilfield, the analysis application may continue to analyze the seismic cube with the new sensor data and continue to send commands to the equipment at the oilfield.

FIG. 5 shows a flowchart for the seismic cube index application (i.e., index application) to process read requests in one or more embodiments. In 501, a read request to read a portion of the seismic cube is intercepted. Specifically, as discussed above, the read request is routed to the index application allowing the analysis application to be unaware of the existence of the index application. The read request may be received from a requestor. For example, the requestor may be a user, the analysis application, or another entity. The receiving of the read request may be based on the read request being addressed to the seismic cube index application or the seismic cube index application may intercept the request addressed to another entity. Other methods for hiding the existence of the seismic cube index application may be used without departing from the scope of the claims.

In 503, from the read request, a virtual location of the portion of the seismic cube is obtained in one or more embodiments. In one or more embodiments, the read request conforms to a predefined protocol that specifies the position of the virtual location in the read request. The index application extracts the virtual location from the read request in accordance with the predefined protocol.

In 505, the seismic cube index is queried to obtain a storage location of the section or sections having the portion of the seismic cube in one or more embodiments. In particular, until the section or sections are identified, the section virtual location is compared with the portion virtual location for each entry in the seismic cube index. The comparison determines whether the portion is in all or part of the boundaries of the section. If the portion is within the boundaries of the section, then the section is identified. Additionally, in one or more embodiments, a determination is made based on the versioning information and a read access policy. For example, consider the scenario in which the read access policy specifies that the most current version should be used. In such an example, the section version information may be used to determine whether the section has the most current version. If the section is not the most current version, then the most current version having the portion is used. Additionally or alternatively, the read access policy may be used to determine which storage location to use when multiple copies of the section are available.

In 507, the seismic cube index is queried to obtain mapping parameters for mapping data locations in the one or more section of the seismic cube with the virtual location in the read request in one or more embodiments. Specifically, the mapping parameters are extracted from the index entry corresponding to the section.

In 509, data locations in the section(s) corresponding to the portion of the seismic cube are calculated in one or more embodiments. In one or more embodiments, calculating the data locations in the section includes using the mapping parameters to map the portion virtual location to the section.

For example, the mapping parameters may indicate to subtract, for each dimension, a predefined value from each dimension to locate portion in the section. As another example, the mapping parameters may provide a function specifying how to map a portion virtual location to the data locations in the section. Thus, the index application may use the portion virtual location as input to the function in the mapping parameters to obtain the data location in the section.

In 511, the read request is transmitted on behalf of the analysis application to the storage location of the section(s) in one or more embodiments. Specifically, for each section identified in 505, a read request is transmitted to the particular location in the storage device storing the section. The read request transmitted in 511 includes the data location calculated in 509. The read request may also include an identifier of the analysis application, such as an internet protocol address.

In 513, the portion of the seismic cube is received from the section(s) in one or more embodiments. In one or more embodiments, the seismic cube index application receives the portions from the section(s).

In 515, a determination is made whether portion spans multiple sections in one or more embodiments. If the portion spans multiple sections, then in 517, the portion of the seismic cube from the multiple sections may be merged to create a single unified portion. Specifically, each sub-portion from each different section is merged together into a single unified section according to where the sub-portion is in relation to the entire seismic cube. As discussed above, sections of the seismic cube may overlap in one or more embodiments. By way of an example, merging from the different sections of the seismic cube includes determining which section has the most recent version of the sub-portion. The section of the seismic cube having the most recent version of the sub-portion is used for the sub-portion, sub-portions from other sections may be cropped to remove the overlapping part of the sub-portion. By merging the sub-portions from the different sections into a single unified portion, the analysis application may maintain a single unified view of the seismic cube.

In 519, the portion (i.e., single unified portion in the case of merging) of the seismic cube is transmitted to the analysis application. Transmitting the portion of the seismic cube to the analysis application may be performed by the index application or by the storage device having the section in one or more embodiments. Specifically, the analysis application may receive the portion directly from the storage device(s) or directly from the index computing device.

Although not shown in FIG. 5, rather than the seismic cube index application transmitting the second read request directly to the storage location(s), the seismic cube index application may indirectly transmit the read request by redirecting the analysis application to the storage locations.

FIG. 6 shows an example flowchart for the index application to process a write request in one or more embodiments. In 601, the index application intercepts a write request for writing resultant seismic data to the seismic cube. Intercepting the write request may be performed in a manner to intercepting the read request as discussed above and in 501 of FIG. 5. Specifically, as discussed above, the write request is routed to the index application allowing the analysis application to be unaware of the existence of the index application.

In 603 of FIG. 6, from the write request, a virtual location of the portion of the seismic cube is obtained in one or more embodiments. In one or more embodiments, the write request conforms to a predefined protocol that specifies the position of the virtual location in the write request. The index application extracts the virtual location from the write request in accordance with the predefined protocol.

In 605, the seismic cube index is queried to obtain a storage location of the section or sections having the current version of the portion of the seismic cube in one or more embodiments. In particular, until the section or sections are identified, the section virtual location is compared with the portion virtual location for each entry in the seismic cube index. The comparison determines whether the portion is in all or part of the boundaries of the section. If the portion is within the boundaries of the section, then the section is identified.

In 607, a determination is made whether to create a new section for the seismic cube. In one or more embodiments, the decision to create a new section may be based, for example, on the write policy. For example, if the write policy indicates that when multiple applications are accessing the section of the seismic cube, then a determination is made whether only one analysis application is accessing the section(s) of the seismic cube. In other words, a determination is made whether multiple analysis applications are processing seismic data in the same section of the seismic cube in parallel. For example, one analysis application may be processing seismic data in one portion of the section while another analysis application is processing seismic data in another portion of the section. As another example, the write policy may indicate that when a particular user or analysis application is writing seismic data, a new section should be created. By way of another example, the write policy may indicate a new section should be written based on the amount of change in the seismic data for the portion of the seismic cube. In other words, the write policy may enforce version control whereby substantial changes to portions of the seismic cube create a new version by creating a new section for the portion. The write policy may be based on data preservation, a requirement for multiple different versions for quality control, security, user access rights, etc.

In one or more embodiments, the write policy may be enforced by the seismic cube index application or the analysis application. For example, the analysis application may send the write request with a request that a new version is written. If the application sends the request that the new version is written, then the determination in Step 607 may be performed by determining whether such a request is received. Alternatively or additionally, the seismic cube index application may enforce the write policy.

In 609, if a determination is made not to create a new section, the seismic cube index is queried to obtain mapping parameters for mapping data locations in the one or more section of the seismic cube with the virtual location in the write request in one or more embodiments. Specifically, the mapping parameters are extracted from the index entry corresponding to the section.

In 611, data locations in the section(s) corresponding to the portion of the seismic cube are calculated in one or more embodiments. In one or more embodiments, calculating the data locations in the section includes using the mapping parameters to map the portion virtual location to the section. For example, the mapping parameters may indicate to subtract, for each dimension, a predefined value from each dimension to locate portion in the section. As another example, the mapping parameters may provide a function specifying how to map a portion virtual location to the data locations in the section. Thus, the index application may use the portion virtual location as input to the function in the mapping parameters to obtain the data location in the section.

In 613, the write request is transmitted on behalf of the analysis application to the storage location of the section(s) in one or more embodiments. Specifically, for each section identified in 605, a write request is transmitted to the particular location in the storage device storing the section. The write request transmitted in 613 includes the data location calculated in 611. In one or more embodiments, rather than the index application directly transmitting the write request, 613 may be performed by the index application redirecting the analysis application and/or the analysis computing device to write to the storage location(s). When the storage device receives the write request, the storage device stores the seismic data in the sections of the seismic cube. Specifically, the storage device updates the data locations in the write request with the resultant seismic data in the write request.

Returning to 607, if the determination is made to create a new section, then a new storage location is selected for storing a new section of the seismic cube in 615. In one or more embodiments, the new storage location may be selected based on a write policy to the analysis computing device executing the analysis application. For example, the new storage location may be selected based on access time for the analysis application to access the storage location. In another example, the new storage location may be based on proximity, such as being in the same building, same country, or on the same computing device as the analysis application. By way of another example, the new storage location may be selected based on import and/or export regulations, such as the existence of any trade embargos. Other criteria for selecting the storage device may be used without departing from the scope of the claims.

In 617, the resultant seismic is stored in the storage location as a new section of the seismic cube in one or more embodiments. Specifically, a write request may be transmitted on behalf of the analysis application to the storage location. In one or more embodiments, rather than the index application directly transmitting the write request, the index application redirecting the analysis application and/or the analysis computing device to write to the storage location. When the storage device receives the write request, the storage device creates a new section and stores the seismic data in the new section of the seismic cube.

In 619, the seismic cube index is updated to reflect a new version for the section of the seismic cube stored in the storage location. Specifically, the portion virtual location in the write request may be used as the section virtual location in the new index entry for the new section. Mapping parameters may be created to map the virtual location to the data locations in the section. Further, in one or more embodiments, the version information may be updated. Updating the version information may include updating the version number for the portion of the seismic cube created to reflect that the new section is the most recent version of the seismic cube. For example, if the version number is a numeric number, then the version number(s) of the one or more index entries identified in 605 are identified. The maximum value of the identified version number(s) is identified. The maximum value is incremented and stored as the version number for the new index entry. If the version number is a time stamp, then a timestamp is added for the new index entry. Additionally or alternatively, updating the version information may include adding a username of the user writing the section, adding comments from the user, adding a program identifier of the analysis application, and/or other such information.

In 621, the seismic cube index is updated for the previous section to indicate that a new version is created for the portion of the seismic cube. For example, updating the index entry may include marking the version information in the index entry to reflect that at least one portion of the seismic cube is no longer the most recent version. The version information may also be updated with the portion virtual location to specify which portion is no longer the most recent version. By marking the index entry, the index application, when accessing the index entry, is aware that for a particular portion, the corresponding section is no longer the most recent version.

The various steps of FIGS. 5 and 7 may be performed repeatedly or intermittently, such as each time an analysis application accesses a particular portion of the seismic cube, each time the analysis application performs a write request, at a predefined interval, etc. Alternatively, the various steps may be performed once, such as the first time that the analysis application requests access to the particular portion of the seismic cube.

The following examples are for explanatory purposes only and not intended to limit the scope of the invention. FIGS. 7.1 and 7.2 show an example in one or more embodiments. In the following example, consider the scenario in which two analysis applications (e.g., analysis application F (702), Analysis Application G (704)) are accessing the seismic cube. Each analysis application executes on an analysis computing device that has local storage (e.g., local analysis computing device F storage (706), local analysis computing device G storage (708)). As shown in FIG. 7.1, the seismic cube as seen by each analysis application (710) is a complete cube. In other words, each example analysis application requests access to the seismic cube as if the seismic cube is located on a single storage device as a unified whole. As shown in FIG. 7.1, in actuality, section 1 of the seismic cube (712) may be stored on network storage X (714) while section 2 of the seismic cube (716) is stored across the Internet (720) on network storage Y (718).

For the example, consider the scenario in which analysis application F (702) requires access to read portions in both section 1 of the seismic cube (712) and section 2 of the seismic cube (716) and write to section 1 of the seismic cube (712). Further, analysis application G (704) requires access to read and write from a different portion in section 2 of the seismic cube (716). In the example, when each application transmits a read request, the index application may identify the particular storage device storing the portion and send a read request to the particular storage device.

In other words, when analysis application F (702) sends a read request using the portion virtual identifier, the index application identifies both section 1 (712) and section 2 (716) as having the requested portion and identifies the data locations of the sub-portions using the portion virtual identifier. The index application sends a read request to network storage X (714) and network storage Y (718) with the data locations and receives the sub-portions from the section. The index application may then merge the two sub-portions together to create a single unified portion and transmit the single unified portion to analysis application F (702).

At the same time, when analysis application G (704) sends a read request using the portion virtual identifier, the index application identifies only section 2 (716) as having the requested portion and identifies the data location of the requested portion. The index application sends a read request to network storage Y (718) with the data location, receives the portion, and transmits the portion to analysis application G (704).

When analysis application F (702) writes to the sub-portion in section 1 (712), the index application determines that analysis application F is the only application writing to section 1 (712). Accordingly, after identifying the data location of the particular portion of section 1 (712) in the write request, the index application sends a write request to the network storage X (714) with the data location. The updated seismic data is written to section 1 of the seismic cube.

When analysis application G (704) requests to write to the portion that is in section 2 (716), the index application determines that analysis application G (704) is not the only application accessing section 2 (718). Accordingly, as shown in FIG. 7.2, index application identifies a storage device (e.g., local analysis computing device G storage (708)) to store a new section (e.g., section 3 of the seismic cube (722). Index application sends a write request to local analysis computing device G storage (708) to write section 3 (722). Further, index application updates the seismic cube index to include a new index entry for section 3 of the seismic cube (722). Thus, additional read and write accesses to the portion of the seismic cube in section 3 (722) are routed to local analysis computing device G storage (708).

Figure 8:
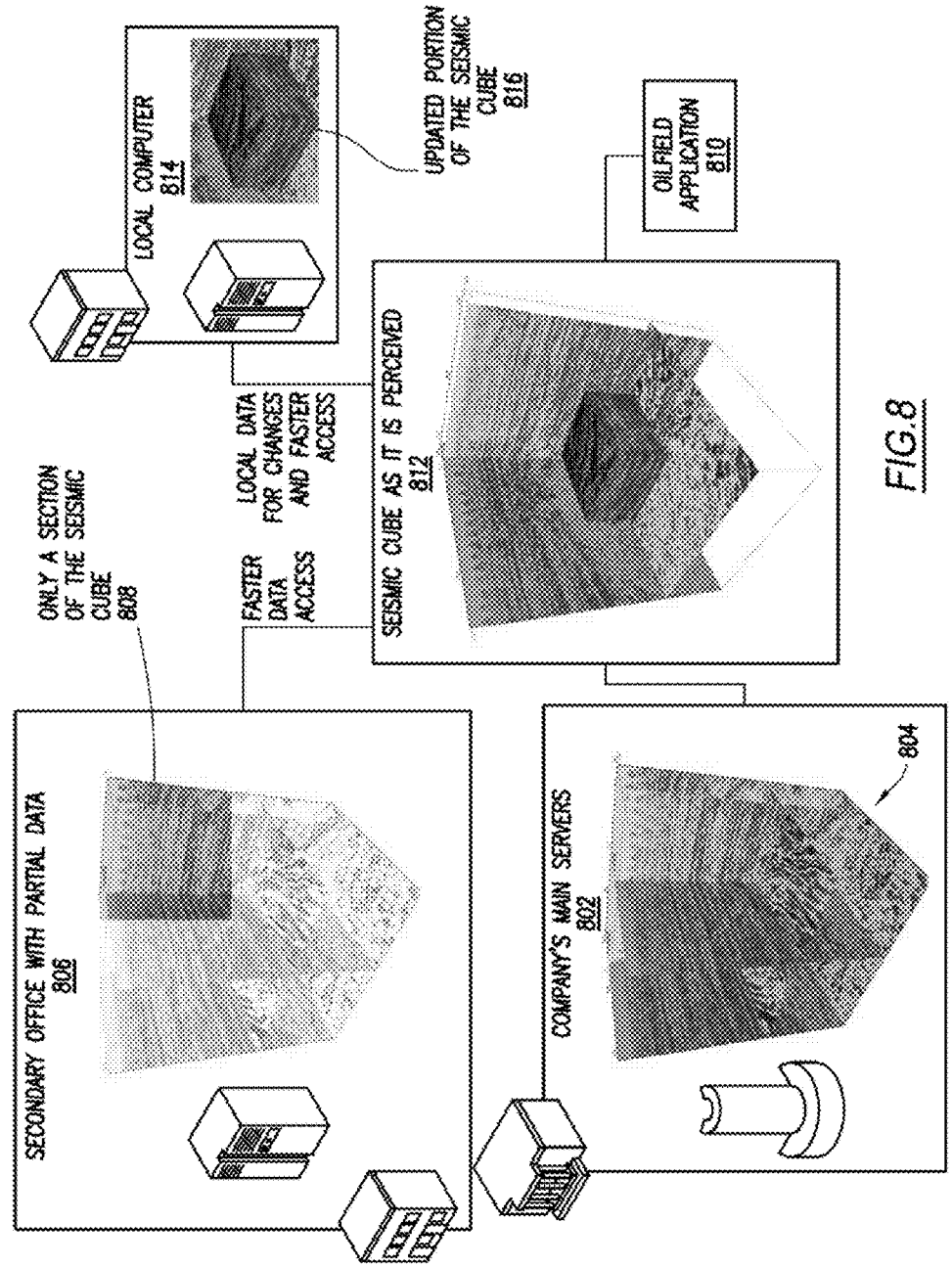

FIG. 8 shows another example in one or more embodiments. For the following example, consider the scenario in which in one building, a company has its main servers (802). The main servers (802) store the entire seismic cube (804). A secondary office (806) has only a section of the seismic cube (808). An oilfield application located in the secondary office perceives only a small portion of the section of the seismic cube (812) because the oilfield application (810) does not require the entire seismic cube. When the oilfield application updates a portion of the section, the updated portion (816) may be stored on the local computer (814) of the oilfield application (810) thereby providing faster data access to the updated portion (816). Thus, the oilfield application (810) using the index application may quickly access the updated portion (816). However, when the oilfield application (810) requires a portion that is not in the updated portion (816), the index application may transmit the access request of the oilfield application (810) to the secondary office (806) because the secondary office provides faster response time then the company's main servers (802). The updated portion may be propagated over time to the entire seismic cube (804). Similarly, the index entry for the section of the seismic cube in the secondary office 806 may be updated to reflect that it is no longer the most current version for the updated portion (816).

As shown in the examples, embodiments provide a mechanism for distributing a seismic cube amongst multiple storage devices. Further, embodiments provide a mechanism for an analysis application to read and write to the seismic cube without being aware that the seismic cube is distributed or where the portion of the seismic cube that it is accessing is located.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is the express intention of the applicant not to invoke 35 U.S.C. §112, paragraph 6 for any limitations of any of the claims herein, except for those in which the claim expressly uses the words 'means for' together with an associated function. Additionally, unless expressly indicated to the contrary, the use of ordinal numbers (e.g., "first," "second," "third") in the claims only indicates that the succeeding nouns modified by the ordinal numbers are distinct from the same noun having different ordinal number as a modifier. The use of the ordinal numbers, unless expressly indicated to the contrary, does not indicate a particular position in the seismic cube.

What is claimed is:

1. A method for processing requests for seismic data, comprising:
    receiving, from a requestor, a first read request to read a first portion of a seismic cube, the first read request comprising a virtual location of the first portion;
    querying a seismic cube index to obtain a mapping parameter and a first storage location of a first section including the first portion of the seismic cube, the mapping parameter mapping virtual locations in the seismic cube with data locations in the first section, wherein the first section is identified using the virtual location of the first portion;
    calculating, with a computer processor and using the mapping parameter, a first data location in the first section corresponding to the virtual location of the first portion;
    transmitting a second read request to the first storage location of the first section, wherein the second read request comprises the first data location;
    detecting that the first portion of the seismic cube spans the first section and a second section;
    querying the seismic cube index to identify a second storage location of the second section;
    calculating a second data location in the second section corresponding to the virtual location of the first portion;
    transmitting a third read request to the second storage location, the third read request comprising the second data location;
    receiving seismic data from the first section and the second section;
    merging the seismic data from the first section and the second section into the first portion of the seismic cube; and
    transmitting the first portion of the seismic cube to the requestor.

2. The method of claim 1, further comprising:
    receiving, from the requestor, a write request for writing resultant seismic data to seismic cube, the write request comprising a virtual location of a second portion of the seismic cube;
    querying, using the virtual location of the second portion, the seismic cube index to identify a third section having the second portion;
    selecting a third storage location for storing a new section of seismic cube;
    storing, in the third storage location, the resultant seismic data as the new section;
    updating the seismic cube index to reflect that the second portion is stored in the third storage location; and
    updating the seismic cube index to indicate, for the third section, that a new version is created for the second portion.

3. The method of claim 2, wherein selecting the third storage location is performed in accordance with a write policy.

4. The method of claim 2, wherein the first section is the same as the third section.

5. The method of claim 1, further comprising:
    receiving, from the requestor, a first write request for writing resultant seismic data to the seismic cube, the first write request comprising a virtual location of a second portion of the seismic cube;
    querying, using the virtual location of the second portion, the seismic cube index to identify a third section having a second portion; and
    sending, to the third section, a second write request to write the resultant seismic data.

6. The method of claim 5, wherein the first section is the same as the third section.

7. The method of claim 1, further comprising:
receiving the first portion of the seismic cube;
analyzing the first portion of the seismic cube to obtain analysis results; and
sending, based on the analysis results, instructions for performing an oilfield operation to oilfield equipment located at the oilfield.

8. The method of claim 1, wherein the seismic cube is divided into sections across a plurality of storage devices distributed across a network.

9. The method of claim 1, wherein the requestor is analysis application.

10. The method of claim 1, wherein receiving the first read request comprises:
intercepting the first read request.

11. A system, comprising:
a memory device;
a first storage device for storing a first section;
a second storage device for storing a second section;
a seismic cube index stored in the memory device and comprising a plurality of index entries,
a first entry of the plurality of index entries comprising:
a virtual location of the first section,
a first storage location of the first section, and
a mapping parameter for mapping virtual locations in a seismic cube to data locations in the first section, and
a second entry of the plurality of index entries comprising:
a virtual location of the second section, and
a second storage location of the second section, the second storage location identifying the second storage device,
a computer processor; and
a seismic cube index application, executing on the computer processor, and configured to:
receive a first read request to read a first portion of the seismic cube, the first read request comprising a virtual location of the first portion,
query, using the virtual location of the first portion, the seismic cube index to obtain the mapping parameter and the first storage location of the first section having the first portion, wherein the first section is identified using the virtual location of the first section and the virtual location of the first portion,
calculate, using the mapping parameter, a first data location in the first section corresponding to the virtual location of the first portion,
transmit a second read request to the first storage location of the first section, the second read request comprising the first data location,
detect that the first portion spans the first section and the second section,
query, using the virtual location of the first portion, the seismic cube index to identify the second storage location of the second section,
calculate a second data location in the second section corresponding to the virtual location of the first portion,
transmit a third read request to the second storage location, the third read request comprising the second data location,
receive seismic data from the first section and the second section,
merge the seismic data from the first section and the second section into the first portion, and
transmit the first portion to a requestor.

12. The system of claim 11, further comprising:
a third storage device,
wherein the seismic cube index application is further configured to:
receive, from the requestor, a write request for writing resultant seismic data to seismic cube, the write request comprising a virtual location of a second portion of the seismic cube;
query, using the virtual location of the second portion, the seismic cube index to identify a third section having the second portion corresponding to the second virtual location;
select a third storage location on the third storage device for storing a new section of seismic cube;
store, in the third storage location, the resultant seismic data as the new section;
update the seismic cube index to reflect that the second portion is stored in the third storage location; and
update the seismic cube index to indicate, for the third section, that a new version is created for the second portion.

13. The system of claim 12, wherein selecting the third storage location is performed in accordance with a write policy.

14. The system of claim 12, wherein the first portion is the same as the second portion.

15. The system of claim 11, further comprising:
an analysis device comprising an analysis application, wherein the analysis application is configured to:
receive the first portion of the seismic cube;
analyze the first portion of the seismic cube to obtain analysis results; and
send, based on the analysis results, instructions for performing an oilfield operation to oilfield equipment located at the oilfield,
wherein the analysis application is the requestor.

16. A distributed computer system comprising a plurality of computing devices, the plurality of computing devices comprising:
an index computing device operatively connected to at least one storage device and at least one analysis computing devices that in turn comprises at least one analysis application, the index computing device configured to:
store a seismic cube index in a memory device;
receive a first write request for writing resultant seismic data to seismic cube, the first write request comprising a virtual location of a first portion of the seismic cube;
query, using the virtual location of the first portion, the seismic cube index to identify a first section having a first portion corresponding to the first virtual location;
select a first storage device of the at least one storage device for storing a new section of seismic cube;
send, to the first storage device, a storage request to store the resultant seismic data as the new section;
update the seismic cube index to reflect that the first portion is stored in a first storage location on the first storage device; and
update the seismic cube index to indicate, for the first section, that a new version is created for the first portion.

17. The distributed computer system of claim 16, wherein the seismic cube index application is further configured to:
- receive a first read request to read a second portion of the seismic cube, the first read request comprising a virtual location of the second portion;
- query, using the virtual location of the second portion, the seismic cube index to obtain a mapping parameter and a first storage location of a second section having the second portion, the mapping parameter for mapping virtual locations in the seismic cube with data locations in the first section;
- calculate, using the mapping parameter, a first data location in the second section corresponding to the virtual location of the second portion; and
- transmit a second read request to the second storage location of the second section, the second read request comprising the first data location.

* * * * *